(12) United States Patent
Okada et al.

(10) Patent No.: US 11,460,095 B2
(45) Date of Patent: Oct. 4, 2022

(54) GEAR REDUCER AND GEARMOTOR

(71) Applicant: DENSO CORPORATION, Kariya (JP)

(72) Inventors: Hiroyuki Okada, Kariya (JP); Masahito Sakai, Kariya (JP); Kazuki Maruo, Kariya (JP); Fumihiro Shimizu, Kariya (JP); Tomoki Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/414,177

(22) PCT Filed: Dec. 27, 2019

(86) PCT No.: PCT/JP2019/051441
§ 371 (c)(1),
(2) Date: Jun. 15, 2021

(87) PCT Pub. No.: WO2020/174872
PCT Pub. Date: Sep. 3, 2020

(65) Prior Publication Data
US 2022/0042580 A1 Feb. 10, 2022

(30) Foreign Application Priority Data
Feb. 25, 2019 (JP) .............................. JP2019-032136

(51) Int. Cl.
*F16H 1/32* (2006.01)
*F16H 19/00* (2006.01)
*F16D 41/10* (2006.01)

(52) U.S. Cl.
CPC ........... *F16H 19/001* (2013.01); *F16D 41/10* (2013.01); *F16H 1/32* (2013.01); *F16H 2019/008* (2013.01)

(58) Field of Classification Search
CPC ..... F16H 19/001; F16H 2019/008; F16H 1/32
See application file for complete search history.

(56) References Cited

U.S. PATENT DOCUMENTS 6,280,359 B1 8/2001 Moskob
6,530,175 B2 * 3/2003 Sato ..................... E05F 11/445
49/350

(Continued)

FOREIGN PATENT DOCUMENTS

CN 104638830 A 5/2015
DE 10261588 A1 7/2004

(Continued)

OTHER PUBLICATIONS

Mar. 3, 2020 International Search Report issued in International Patent Application No. PCT/JP2019/051441.

*Primary Examiner* — Huan Le
(74) *Attorney, Agent, or Firm* — Oliff PLC

(57) ABSTRACT

A gear reducer has a helical gear, an eccentric shaft that is joined to the helical gear and has a first supporting portion that is offset in a rotation radial direction with respect to a rotation shaft of the helical gear, and a slider plate that is disposed at a radial direction outer side of the eccentric shaft. Further, the gear reducer has a transmitting gear that is supported at a first supporting portion, and whose rotation around its own axis is restricted due to the transmitting gear being engaged with the slider plate, and that revolves due to the helical gear rotating together with the eccentric shaft, and has an output gear body that rotates due to the transmitting gear revolving. The transmitting gear has a pair of restricting projections that project-out toward the slider plate side, and the slider plate is disposed between the pair of restricting projections.

6 Claims, 7 Drawing Sheets

(56) References Cited

U.S. PATENT DOCUMENTS

| | | |
|---|---|---|
| 7,455,613 B2 | 11/2008 | Genter et al. |
| 2013/0109526 A1* | 5/2013 | Oishi .................. H02K 7/1166 475/149 |
| 2019/0356196 A1 | 11/2019 | Izuchi et al. |

FOREIGN PATENT DOCUMENTS

| | | |
|---|---|---|
| DE | 102007041602 A1 | 3/2009 |
| DE | 112019003566 T5 | 3/2021 |
| JP | 2008-051163 A | 3/2008 |
| JP | 2013-99085 A | 5/2013 |
| JP | 2018-80791 A | 5/2018 |
| JP | 2020-016331 A | 1/2020 |

* cited by examiner

GEAR REDUCER AND GEARMOTOR

TECHNICAL FIELD

Present aspects relate to a gear reducer and a gearmotor.

BACKGROUND ART

A gearmotor having a gear reducer that decelerates the rotation of a motor is disclosed in Chinese Patent Application Publication No. 104638830. The gear reducer disclosed in that document has a worm that is fixed to the rotation shaft of the motor, a worm wheel that meshes with the worm, a gear that, due to the worm wheel rotating, revolves in a state in which rotation around its own axis is restricted, and an output shaft that rotates due to the rotation force, which accompanies the revolving of the revolving gear, being transmitted thereto. Further, a member that restricts rotation of the revolving gear around its own axis is provided between the worm wheel and the revolving gear.

SUMMARY

Technical Problem

By the way, the gear reducer of the gearmotor that is disclosed in Chinese Patent Application Publication No. 104638830 is structured such that the rotation of the revolving gear around its own axis is restricted due to a portion of the revolving gear engaging with the inner peripheral surface of the member that restricts the rotation of the revolving gear around its own axis. Therefore, it is difficult to devise downsizing of the build, in the radial direction, of the member that restricts the rotation of the revolving gear around its own axis, and downsizing of the builds of the gear reducer and a motor that has this gear reducer is hindered.

In view of the above-described circumstances, an object is to provide a gear reducer and a gearmotor at which downsizing of the builds thereof can be devised.

Solution to Problem

In order to solve the above-described problem, a gear reducer relating to a present aspect comprises: a first gear that rotates due to rotational force being transmitted thereto; an eccentric shaft that is joined to the first gear, and that has a supporting portion that is offset in a rotation radial direction with respect to a rotation shaft of the first gear; an own-axis-rotation restricting member that is disposed at a radial direction outer side of the eccentric shaft; a transmitting gear that is supported at the supporting portion, and whose rotation around its own axis is restricted due to the transmitting gear being engaged with the own-axis-rotation restricting member, and that revolves around the rotation shaft of the first gear due to the first gear rotating together with the eccentric shaft; and an output portion that rotates due to the transmitting gear revolving, wherein the transmitting gear has a pair of restricting projections that project-out toward the own-axis-rotation restricting member side, and the own-axis-rotation restricting member is disposed between the pair of restricting projections.

In order to solve the above-described problem, a gearmotor relating to a present aspect comprises: a motor that has a rotation shaft; a first gear that rotates due to rotational force of the rotation shaft being transmitted thereto; an eccentric shaft that is joined to the first gear, and that has a supporting portion that is offset in a rotation radial direction with respect to a rotation shaft of the first gear; an own-axis-rotation restricting member that is disposed at a radial direction outer side of the eccentric shaft; a transmitting gear that is supported at the supporting portion, and whose rotation around its own axis is restricted due to the transmitting gear being engaged with the own-axis-rotation restricting member, and that revolves around the rotation shaft of the first gear due to the first gear rotating together with the eccentric shaft; and an output portion that rotates due to the transmitting gear revolving, wherein the transmitting gear has a pair of restricting projections that project-out toward the own-axis-rotation restricting member side, and the own-axis-rotation restricting member is disposed between the pair of restricting projections.

Advantageous Effects of Invention

The above-described gear reducer and gearmotor have the excellent effect that downsizing of the builds thereof can be devised.

DESCRIPTION OF EMBODIMENTS

Figure 1:
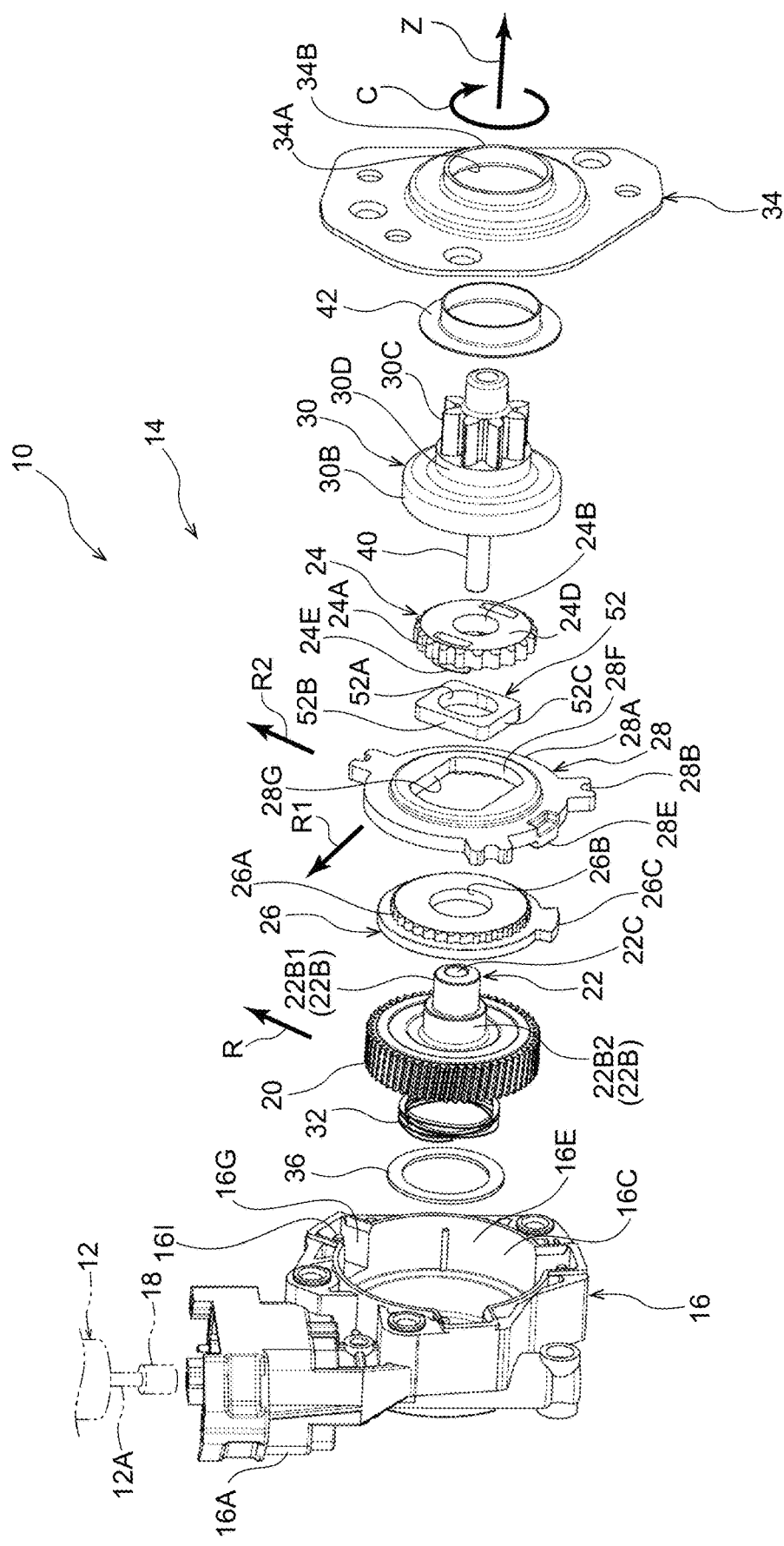
FIG. 1 is an exploded perspective view that shows a gearmotor in an exploded manner.

A gearmotor 10 relating to an embodiment of the present aspect is described by using FIG. 1 through FIG. 4. Note that the arrow Z direction, the arrow R direction and the arrow C direction that are shown appropriately in the drawings indicate a rotation axial direction one side, a rotation radial direction outer side and a rotation peripheral direction one side of a pinion gear 30C that is the output gear, respectively. Further, the side opposite the arrow Z direction, the side opposite the arrow R direction and the side opposite the arrow C direction indicate a rotation axial direction another side, a rotation radial direction inner side, and a rotation peripheral direction another side of the pinion gear 30C that is the output gear, respectively. Moreover, when simply axial direction radial direction and peripheral direction are used, they refer to the rotation axial direction, the rotation radial direction, and the rotation peripheral direction of the pinion gear 30C, unless otherwise indicated.

Figure 2:
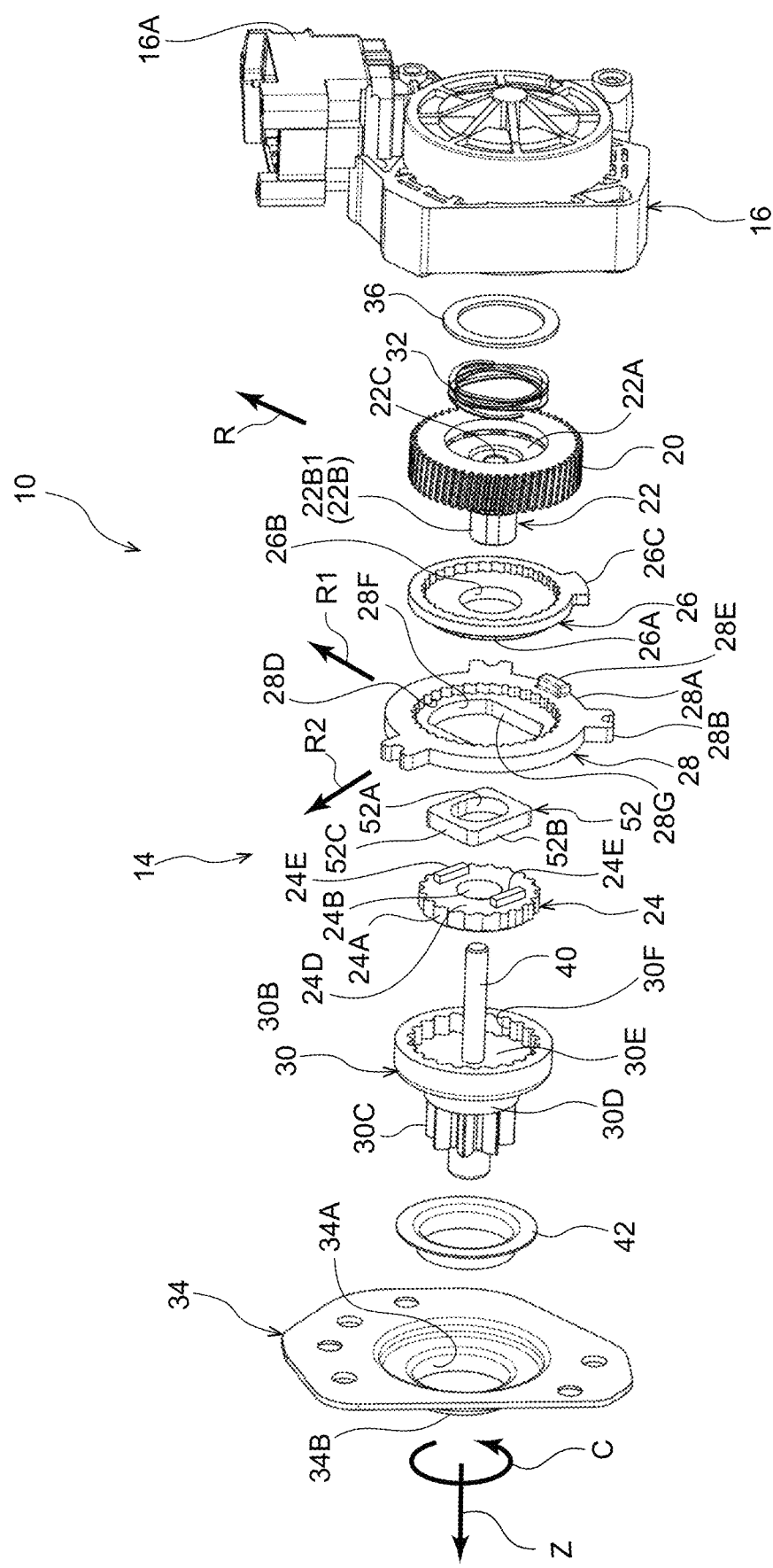
FIG. 2 is an exploded perspective view that shows the gearmotor in an exploded manner, and is a view that is seen from the side opposite FIG. 1.
Figure 3:
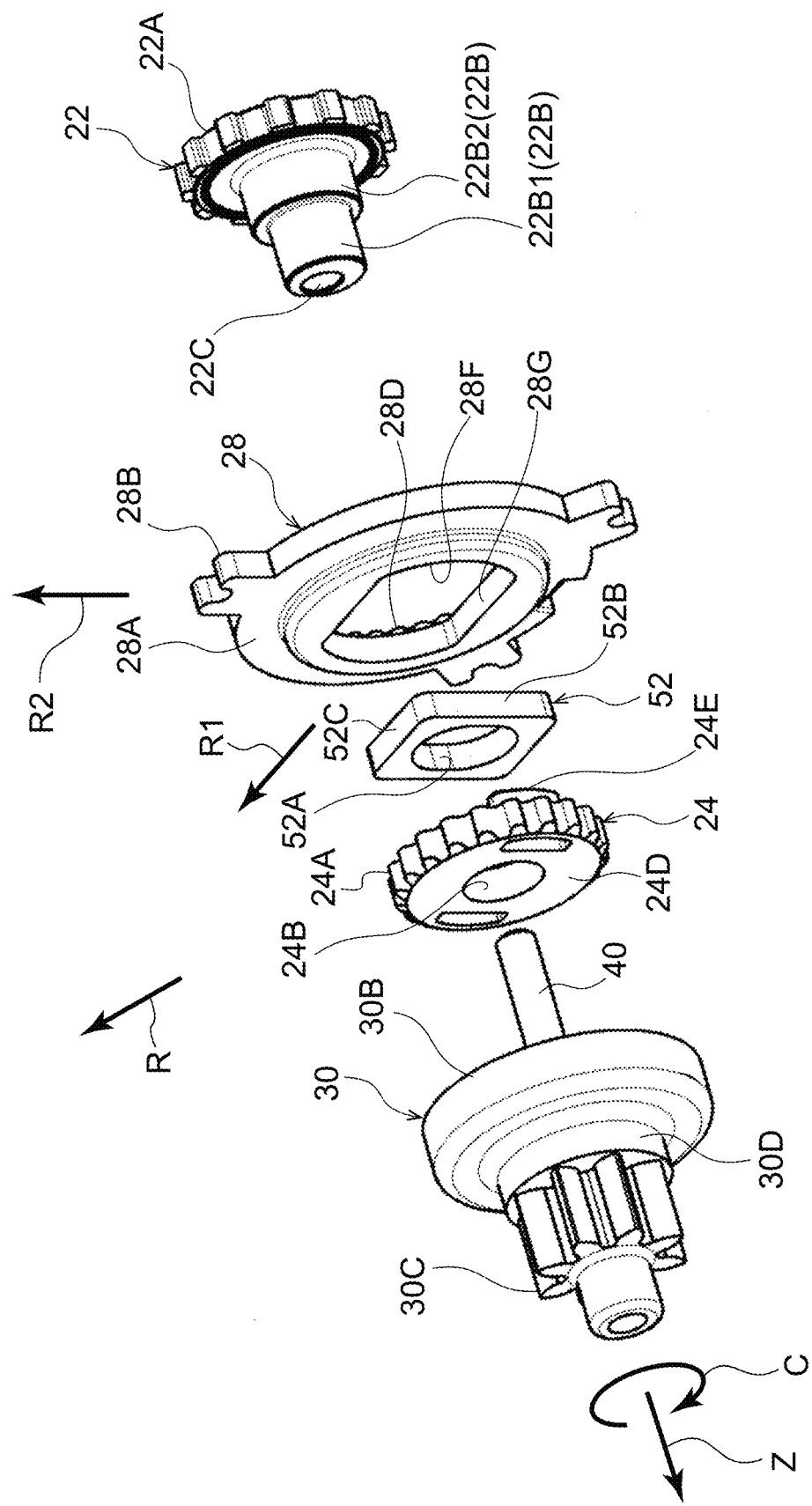
FIG. 3 is an exploded perspective view showing an eccentric shaft, a fixed gear, a transmitting gear, and an output gear body that structure a portion of a gear reducer.

As shown in FIG. 1, FIG. 2 and FIG. 3, the gearmotor 10 of the present embodiment is a motor for a power seat that is for moving a seat cushion of a vehicle seat in the seat vertical direction. This gearmotor 10 has a motor 12 that is a DC motor. Further, the gearmotor 10 has a gear reducer 14 that is for decelerating the rotation of a rotation shaft 12A of the motor 12, and transmitting the decelerated rotational force to an output gear body 30 that serves as the output portion. Moreover, the gearmotor 10 has a housing 16 to which the motor 12 is mounted and at whose interior the gear reducer 14 is provided.

The gear reducer 14 has a worm gear 18 that is fixed to the rotation shaft 12A of the motor 12, a helical gear 20 that serves as the first gear and meshes with the worm gear 18, and an eccentric shaft 22 that is provided integrally with the helical gear 20.

Further, the gear reducer 14 has a transmitting gear 24 and a lock gear 26 that are supported at the eccentric shaft 22, and a fixed gear 28 that meshes with the lock gear 26. Moreover, the gear reducer 14 has a slider plate 52 that serves as the own-axis-rotation restricting member, and that is supported at the fixed gear 28, and that, by being engaged with the transmitting gear 24, restricts rotation of the transmitting gear 24 around its own axis. Further, the gear reducer 14 has the output gear body 30 that meshes with the transmitting gear 24, and that has the pinion gear 30C, and whose axial direction faces in the same direction as the axial directions of the helical gear 20, the transmitting gear 24 and the lock gear 26 (faces in the arrow Z direction and the direction opposite to the arrow Z direction), and that is disposed coaxially with the helical gear 20.

Further, the gearmotor 10 has a spring 32 for suppressing rattling of the eccentric shaft 22, the helical gear 20 and the like in the axial direction. Further, the gearmotor 10 has a cover plate 34 that, due to the cover plate 34 being fixed to the housing 16, the gear reducer 14 is accommodated within the housing 16.

As shown in FIG. 1 and FIG. 2, the housing 16 is formed by using a resin material. This housing 16 has a motor fixing portion 16A that is fixed in a state in which the rotation shaft 12A of the motor 12 faces in a direction orthogonal to the axial direction (the arrow Z direction). Further, the housing 16 has a gear reducer accommodating concave portion 16C in which the gear reducer 14 is accommodated. This gear reducer accommodating concave portion 16C is formed in a concave shape whose axial direction one side (arrow Z direction side) is open.

As shown in FIG. 1, the gear reducer accommodating concave portion 16C is structured to include a bottom wall portion that forms the bottom of the gear reducer accommodating concave portion 16C, and a side wall portion 16E that extends toward the axial direction one side from the outer peripheral portion of the bottom wall portion and whose inner peripheral surface is formed substantially in the shape of a cylindrical tubular surface. A boss portion, which is cylindrical tube shaped and in which the axial direction another side end portion of a rotation central shaft 40 that is described later is inserted with clearance, stands upright at the central portion of the bottom wall portion of the gear reducer accommodating concave portion 16C. Further, the spring 32 is disposed around the boss portion at the bottom wall portion. Note that a washer 36 is interposed between the bottom wall portion and the spring 32.

Three fixed gear engaging portions 16G, which restrict rotational displacement of the fixed gear 28 that is described later in the peripheral direction due to portions of the fixed gear 28 being fit-together therewith, are formed at the inner peripheral portion of the side wall portion 16E of the gear reducer accommodating concave portion 16C. Pillar portions 16I that are shaped as cylindrical pillars are provided at the three fixed gear engaging portions 16G.

The cover plate 34 is formed by using a steel plate member or the like. An exposure opening 34A, which is for exposing the pinion gear 30C to the outer side of the gear reducer accommodating concave portion 16C of the housing 16, is formed in this cover plate 34. Further, a rib 34B, which is annular and is bent toward the axial direction another side, is formed at the peripheral edge portion of the exposure opening 34A at the cover plate 34.

A spiral tooth portion is formed at the outer peripheral portion of the worm gear 18. Due to the motor 12, which is in a state in which the worm gear 18 is fixed to the rotation shaft 12A, being fixed to the housing 16, the worm gear 18 is disposed at the bottom wall portion side of the gear reducer accommodating concave portion 16C and at the inner peripheral surface side of the side wall portion 16E of the housing 16.

As shown in FIG. 1 and FIG. 2, the helical gear 20 is formed by using a resin material. Plural outer teeth which mesh with the tooth portion of the worm gear 18 are formed at the outer peripheral portion of the helical gear 20. The eccentric shaft 22 that is described later is fixed to the axially central portion of the helical gear 20 by insert molding. Further, the helical gear 20 is rotatably supported at the housing 16 via the eccentric shaft 22 and the rotation central shaft 40.

As shown in FIG. 2 and FIG. 3, the eccentric shaft 22 is formed by using a metal material, and can rotate integrally with the helical gear 20 due to a portion thereof being inserted in the helical gear 20. Concretely, the eccentric shaft 22 has a disc portion 22A that is formed in the shape of a disc and extends in the radial direction with the axial direction being the thickness direction thereof. The outer peripheral portion of this disc portion 22A is formed in a recessed and protruded form along the peripheral direction. Further, the disc portion 22A is fixed to the inner peripheral portion of the helical gear 20 in a state in which the axial center of the disc portion 22A and the rotational center of the helical gear 20 coincide.

Further, as shown in FIG. 1 and FIG. 3, the eccentric shaft 22 has a supporting portion 22B that projects-out toward the axial direction one side from the central portion of the disc portion 22A. The axial direction one side of the supporting portion 22B is a first supporting portion 22B1 at which the transmitting gear 24, which is described later, is rotatably supported. Further, the axial direction another side of the supporting portion 22B is a second supporting portion 22B2 that is set to a larger diameter than the first supporting portion 22B1 and at which the lock gear 26, which is described later, is rotatably supported. The axial centers of the first supporting portion 22B1 and the second supporting portion 22B2 are offset, toward one radial direction outer side direction, with respect to the axial center of the disc portion 22A.

Figure 4:
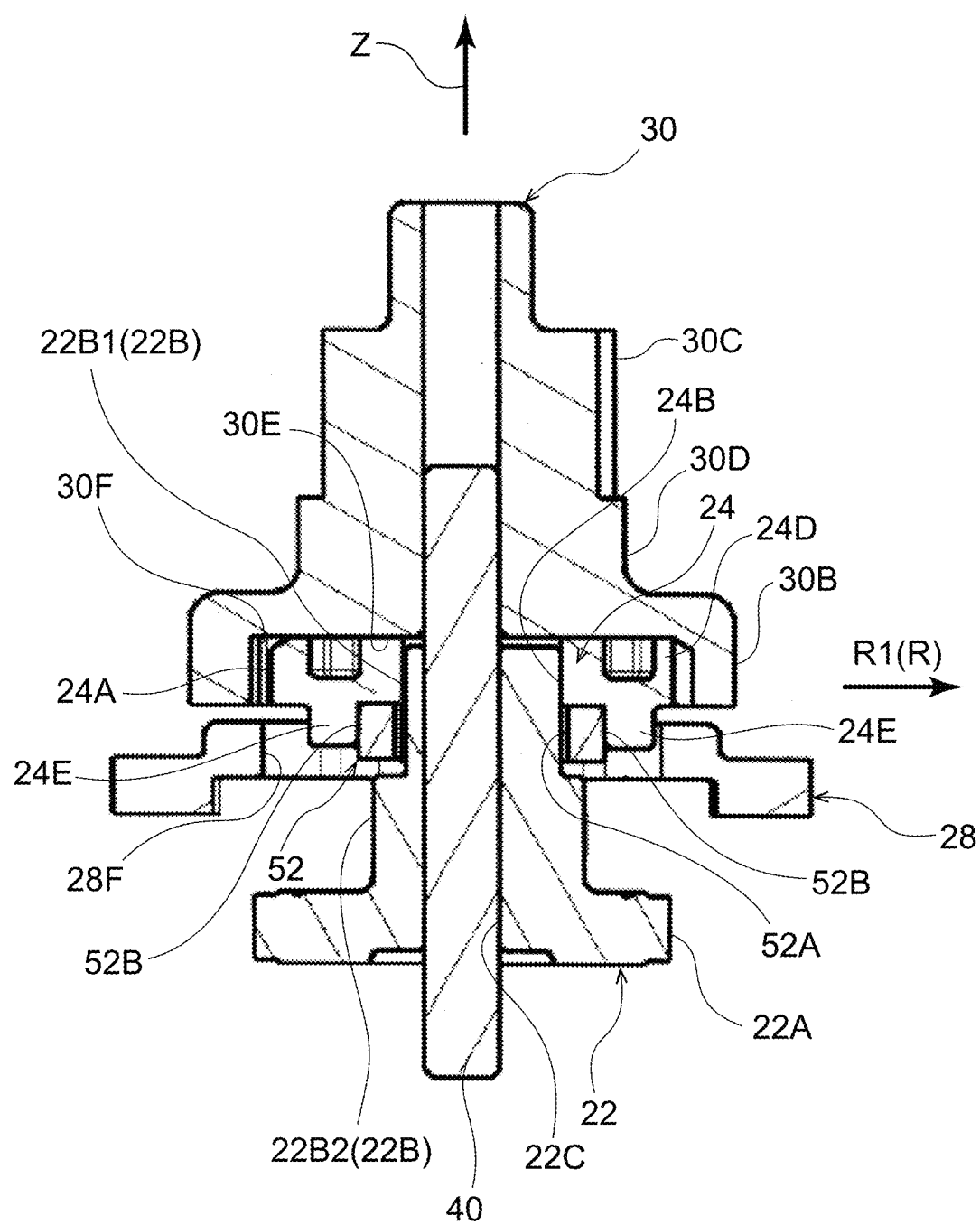
FIG. 4 is a cross-sectional view showing the cross-sections, which are cut along a rotation axial direction, of the eccentric shaft, the fixed gear, the transmitting gear, and the output gear body that structure a portion of the gear reducer.

Further, as shown in FIG. 2, FIG. 3 and FIG. 4, a rotation central shaft insert-through hole 22C, through which the disc portion 22A, the first supporting portion 22B1 and the second supporting portion 22B2 pass in the axial direction and into which the rotation central shaft 40 is inserted, is formed in the eccentric shaft 22. The axial center of this rotation central shaft insert-through hole 22C (the axial center of the rotation central shaft 40 that is inserted-through the rotation central shaft insert-through hole 22C) coincides with the axial center of the disc portion 22A.

As shown in FIG. 2 and FIG. 4, the output gear body 30 is formed by using a metal material. This output gear body 30 has a transmitting gear engaging portion 30B that engages with the transmitting gear 24. As shown in FIG. 2, an accommodating concave portion 30E, which opens toward the transmitting gear 24 side (the axial direction another side) and at whose interior a transmitting gear main body portion 24D of the transmitting gear 24 is disposed, is formed in the transmitting gear engaging portion 30B. Plural inner teeth 30F that mesh with outer teeth 24A of the transmitting gear 24 are formed at the inner peripheral portion of the radial direction outer side of this accommodating concave portion 30E.

Further, the output gear body 30 has the pinion gear 30C that is disposed coaxially with the transmitting gear engaging portion 30B at the axial direction one side of the transmitting gear engaging portion 30B, and at whose outer peripheral portion plural outer teeth are formed. Further, the intermediate portion, between the transmitting gear engaging portion 30B and the pinion gear 30C, at the output gear body 30 is a pivotally-supported portion 30D that is pivotally supported by the rib 34B that is formed at the cover plate 34. Note that a shaft-receiving bush 42 that is formed by using a resin material or the like is engaged with the inner peripheral surface of the rib 34B. Due thereto, contact between the metals of the pivotally-supported portion 30D of the output gear body 30 and the rib 34B of the cover plate 34 is prevented or suppressed. Further, the rotation central shaft 40, which is formed in the shape of a rod by using a metal material, is fixed to the axially central portion of the output gear body 30 by press-fitting or the like.

As shown in FIG. 1 and FIG. 2, the fixed gear 28 is formed by press working or the like being carried out on a metal material. This fixed gear 28 has a fixed gear main body portion 28A that is formed in an annular shape as seen in the axial direction. Further, the fixed gear 28 has three engaging projections 28B that project-out from the fixed gear main body portion 28A toward the radial direction outer side. Further, the fixed gear 28 is fixed to the housing 16 due to unillustrated bush nuts being engaged with the pillar portions 16I in the state in which the engaging projections 28B are engaged with the fixed gear engaging portions 16G of the housing 16.

Plural inner teeth 28D, with which the lock gear 26 that is described later mesh, are formed at the inner peripheral portion of the fixed gear main body portion 28A.

Moreover, the fixed gear 28 has a second restricting portion 28E that projects-out toward the axial direction another side from the fixed gear main body portion 28A. This second restricting portion 28E projects-out from a peripheral direction portion of the fixed gear main body portion 28A toward the axial direction another side.

Further, a slider plate engaging hole 28F, whose edge portion is formed in a rectangular shape (an oblong shape) as seen in the axial direction and at whose interior the slider plate 52 is disposed, is formed in the axially central portion at the axial direction one side of the portion, at which the inner teeth 28D are formed, of the fixed gear main body portion 28A of the fixed gear 28. Further, at the edge portion of the slider plate engaging hole 28F, the surfaces, which are disposed so as to face a pair of first slider surfaces 52C of the slider plate 52 that is described later in the radial direction respectively, are second slider surfaces 28G. Further, rotation of the slider plate 52 with respect to the fixed gear 28 is restricted due to the first slider surfaces 52C and the second slider surfaces 28G being disposed so as to face one another and be close to one another. Further, due to the first slider surfaces 52C sliding on the second slider surfaces 28G, displacement of the slider plate 52 and the transmitting gear 24 in one direction R1 that is a radial direction is permitted. Due thereto, at the time when the eccentric shaft 22 rotates, the transmitting gear 24 revolves around the axial center of the rotation central shaft 40 in a state in which the rotation of the transmitting gear 24, which is supported at the first supporting portion 22B1 of the eccentric shaft 22, around its own axis is restricted.

As shown in FIG. 1, FIG. 2, FIG. 3 and FIG. 4, the transmitting gear 24 is formed substantially in the shape of a disc by press working or the like being carried out on a metal material. This transmitting gear 24 has the transmitting gear main body portion 24D at whose outer peripheral portion the plural outer teeth 24A are formed. A supporting hole 24B, which is supported at the first supporting portion 22B1 of the eccentric shaft 22, is formed in the central portion of the transmitting gear main body portion 24D. Further, the transmitting gear 24 has two restricting projections 24E that project-out toward the axial direction another side from the axial direction another side surface of the transmitting gear main body portion 24D. These two restricting projections 24E are disposed at a uniform interval (a pitch of 180 degrees) along the peripheral direction. Further, due to the two restricting projections 24E engaging with the slider plate 52 that is described later, rotation (own-axis-rotation) of the transmitting gear 24 around the first supporting portion 22B1 of the eccentric shaft 22 is restricted.

As shown in FIG. 1 and FIG. 3, the slider plate 52 is formed by using a plate member that is made of metal, and is formed in a rectangular shape (an oblong shape) as seen in the axial direction. This slider plate 52 is disposed between the two restricting projections 24E of the transmitting gear 24, at the interior of the slider plate engaging hole 28F that is formed in the fixed gear 28. Further, the surfaces, which are disposed so as to face the two restricting projections 24E in the radial direction respectively, at the outer peripheral portion of the slider plate 52 are engaged surfaces 52B. Further, in the state in which the slider plate 52 is disposed between the two restricting projections 24E of the transmitting gear 24, displacement of the transmitting gear 24 with respect to the slider plate 52 in the direction in which the engaged surfaces 52B and the restricting projections 24E face one another (the one direction R1 that is a radial direction) is restricted, and rotation (own-axis-rotation) of the transmitting gear 24 with respect to the slider plate 52 is restricted. Further, due to the restricting projections 24E sliding on the engaged surfaces 52B, displacement of the transmitting gear 24 with respect to the slider plate 52 in the direction in which the engaged surfaces 52B and the restricting projections 24E slide (another direction R2 that is a radial direction that is orthogonal to the one direction R1 that is a radial direction) is permitted. Further, the pair of surfaces, which are disposed so as to face and be near to the second slider surfaces 28G of the slider plate engaging hole 28F, at the outer peripheral portion of the slider plate 52 are the first slider surfaces 52C. Note that an insert-through hole 52A, which is shaped as a long hole (shaped as a long hole whose length direction is the another direction R2 that is a radial direction) and through which the first supporting portion 22B1 of the eccentric shaft 22 is inserted, is formed in the axially central portion of the slider plate 52. Further, in the present embodiment, the interval between the pair of engaged surfaces 52B of the slider plate 52 is set to a dimension that is smaller than the interval between the pair of first slider surfaces 52C. Due thereto, as seen in the axial direction, the slider plate 52 is a rectangular shape at which the pair of engaged surfaces 52B are the long sides and the pair of first slider surfaces 52C are the short sides.

As shown in FIG. 1 and FIG. 2, in the same way as the transmitting gear 24, the lock gear 26 is formed in a disc-shape due to press working or the like being carried out on a metal material. Outer teeth 26A, which mesh with the inner teeth 28D of the fixed gear 28, are formed at the outer peripheral portion of the lock gear 26 over the entire periphery thereof. A supporting hole 26B, which is supported at the second supporting portion 22B2 of the eccentric shaft 22, is formed in the central portion of the lock gear 26. Moreover, the lock gear 26 has a first restricting portion 26C that projects-out toward the radial direction outer side and that is formed in a fan shape as seen from the axial direction. This first restricting portion 26C is provided at a peripheral direction portion of the lock gear 26. Further, in the state in which outer teeth 26A of the lock gear 26 are meshed with the inner teeth 28D of the fixed gear 28, the first restricting portion 26C is disposed along the axial direction another side surface of the fixed gear main body portion 28A of the fixed gear 28.

Operation and Effects of Present Embodiment

Operation and effects of the present embodiment are described next.

As shown in FIG. 1 and FIG. 2, in accordance with the gearmotor 10 of the present embodiment, when the rotation shaft 12A of the motor 12 rotates, the worm gear 18 rotates. Further, when the worm gear 18 rotates, the helical gear 20 that is meshed with the worm gear 18 rotates together with the eccentric shaft 22.

Figure 5:
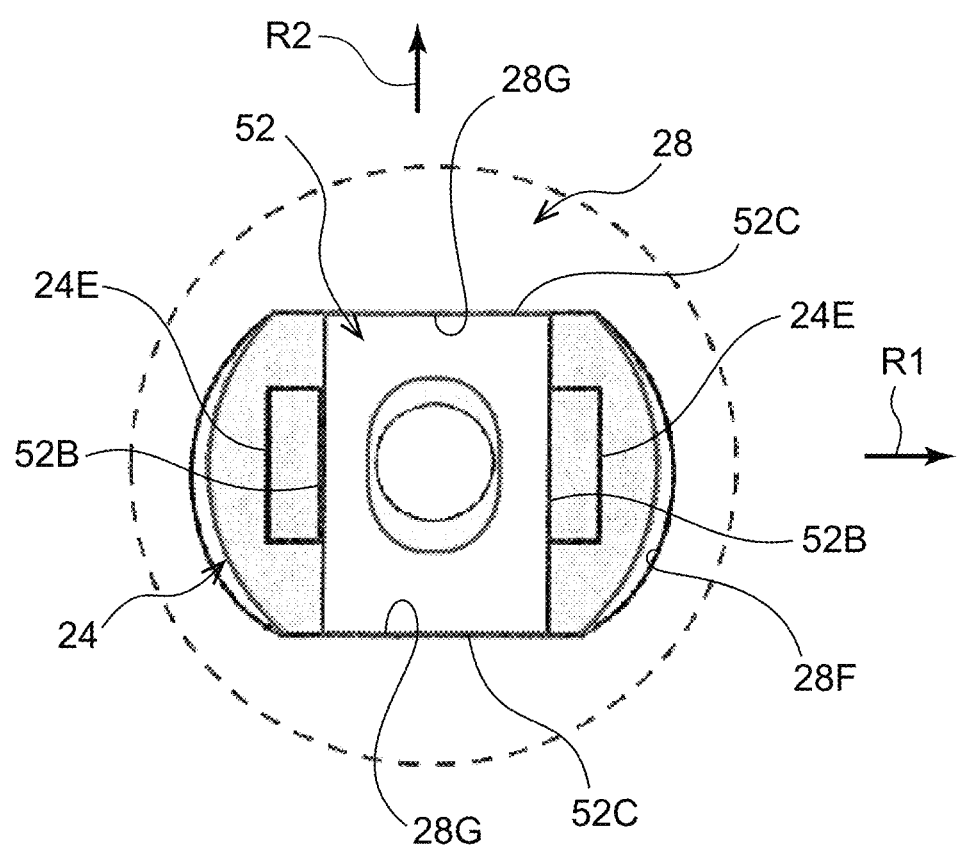
FIG. 5 is a front view schematically showing the fixed gear, a slider plate and the transmitting gear.
Figure 6:
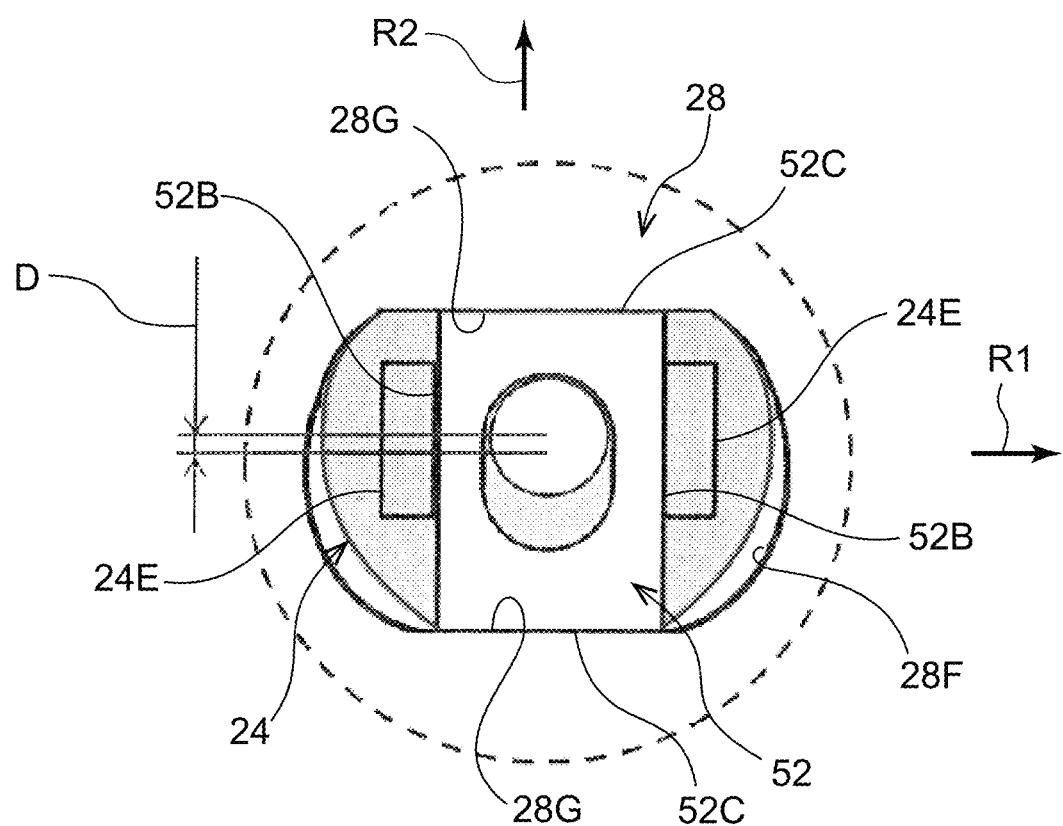
FIG. 6 is front view that schematically shows the fixed gear, the slider plate and the transmitting gear, and illustrates from the state shown in FIG. 5 to a state in which the eccentric shaft rotates.
Figure 7:
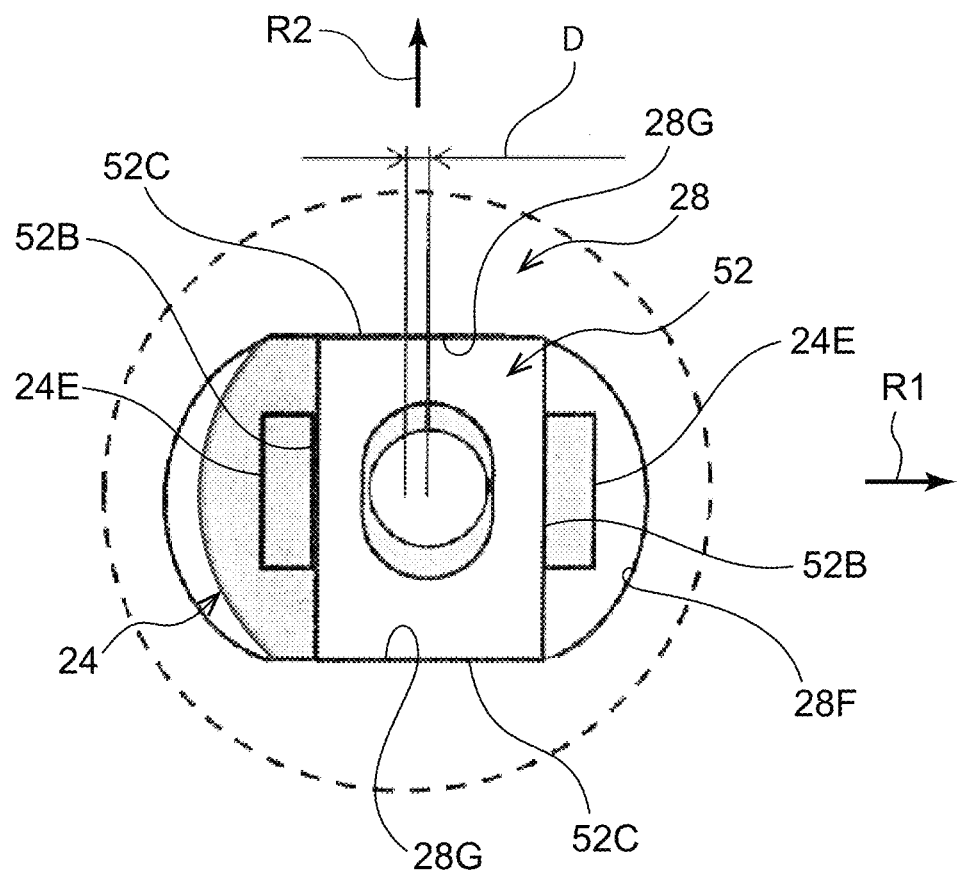
FIG. 7 is front view that schematically shows the fixed gear, the slider plate and the transmitting gear, and illustrates from the state shown in FIG. 6 to a state in which the eccentric shaft rotates further.

Moreover, when the eccentric shaft 22 rotates, the transmitting gear 24 that is supported at the first supporting portion 22B1 of the eccentric shaft 22 revolves around the rotation central shaft 40. In more detail, as shown in FIG. 5, FIG. 6 and FIG. 7, when the eccentric shaft 22 rotates, the restricting projections 24E of the transmitting gear 24 move in the radial direction (arrow R2 and the direction opposite R2) while sliding on the engaged surfaces 52B of the slider plate 52. Further, the slider plate 52 and the transmitting gear 24 move in the radial direction (arrow R1 and the direction opposite R1) while the first slider surfaces 52C of the slider plate 52 slide on the second slider surfaces 28G of the fixed gear 28. Due thereto, the transmitting gear 24 revolves around the axial center of the rotation central shaft 40, in the state in which the own-axis-rotation of the transmitting gear 24, which is supported by the first supporting portion 22B1 of the eccentric shaft 22, is restricted. Note that dimension D that is shown in FIG. 6 and FIG. 7 is the amount of offset of the axial center of the first supporting portion 22B1 with respect to the axial center of the disc portion 22A.

As shown in FIG. 1 and FIG. 2, when the transmitting gear 24 revolves, the rotational force that accompanies this revolution is transmitted to the output gear body 30 from the outer teeth 24A of the transmitting gear 24 via the inner teeth 30F of the output gear body 30. Due thereto, the output gear body 30 rotates, and the power seat of the vehicle can be operated via a gear that meshes with the pinion gear 30C of the output gear body 30.

Further, when the eccentric shaft 22 rotates, the lock gear 26, which is supported by the second supporting portion 22B2 of the eccentric shaft 22, rotates around its own axis and revolves around the rotation central shaft 40 while remaining meshed with the fixed gear 28. Then, when the first restricting portion 26C of the lock gear 26 abuts the second restricting portion 28E of the fixed gear 28, revolution and rotation around its own axis of the lock gear 26 are restrained. Due thereto, rotation of the eccentric shaft 22 and the helical gear 20 are stopped, and rotation of the output gear body 30 is stopped (rotation is restricted). As a result, an excessive force being inputted from the gearmotor 10 to the vehicle seat is prevented or suppressed, and a deterioration in the seating comfort, which is due to members that structure the vehicle seat deforming or the like, can be prevented or suppressed.

Further, in the present embodiment, both the lock gear 26, which is for restricting the amount of rotation of the output gear body 30, and the slider plate 52, which is for restricting the rotation of the transmitting gear 24 around its own axis, are structures that mesh with or engage with the single fixed gear 28. Due thereto, as compared with a case in which the lock gear 26 and the slider plate 52 are structures that mesh with respectively different fixed gears, downsizing of the builds, in the axial direction, of the gear reducer 14 and the gearmotor 10 that is structured to include this gear reducer 14 can be devised. Further, in the present embodiment, the transmitting gear 24 and the slider plate 52 are disposed in a state of being adjacent to and contacting one another in the axial direction. Due thereto, even further downsizing of the builds, in the axial direction, of the gear reducer 14 and the gearmotor 10 that is structured to include this gear reducer 14 can be devised.

Further, in the present embodiment, the slider plate 52, which restricts rotation of the transmitting gear 24 around its own axis, is disposed between the two restricting projections 24E of the transmitting gear 24. Due thereto, as compared with a structure in which the two restricting projections 24E of the transmitting gear 24 engage with the inner peripheral portion of the slider plate 52, an increase in the radial direction dimension of the slider plate 52 can be suppressed. Due thereto, downsizing of the builds, in the radial direction, of the gear reducer 14 and the gearmotor 10 that is structured to include this gear reducer 14 can be devised.

Further, in the present embodiment, by setting the interval between the pair of engaged surfaces 52B of the slider plate 52 to be a dimension that is smaller than the interval between the pair of first slider surfaces 52C, the slider plate 52 is, as seen in the axial direction, a rectangular shape at which the pair of engaged surfaces 52B are the long sides. Due thereto, the interval between the two restricting projections 24E of the transmitting gear 24 increasing can be suppressed, and an increase in the diameter of the transmitting gear 24 can be suppressed. As a result, even further downsizing of the builds, in the radial direction, of the gear reducer 14 and the gearmotor 10 that is structured to include this gear reducer 14 can be devised.

Note that the present embodiment describes an example in which the interval between the pair of engaged surfaces 52B of the slider plate 52 is set to be a dimension that is smaller than the interval between the pair of first slider surfaces 52C, but the present invention is not limited to this. It suffices to establish whether or not the interval between the pair of engaged surfaces 52B of the slider plate 52 is set to be a dimension that is smaller than the interval between the pair of first slider surfaces 52C, appropriately in consideration of the reduction ratio of the gear reducer 14, the outer diameter of the transmitting gear 24, and the like.

Further, although the present embodiment describes an example in which the lock gear 26 that stops the rotation of the output gear body 30 is provided, the present invention is not limited to this. It suffices to select whether or not the lock gear 26 is to be provided, appropriately in consideration of the rigidities of the seat cushion frame and the links that structure portions of the vehicle seat.

Further, the gear reducer 14, which structures a portion of the above-described gearmotor 10, is a gear reducer to which a so-called planetary gear mechanism is applied. Therefore, it suffices to select the gear whose rotation is limited, appropriately in consideration of the reduction ratio that is required of the gear reducer 14, and the like. Namely, it suffices to select which structure among a planetary type such as a 2K-H planetary gear mechanism, a 3K planetary gear mechanism or the like, a solar type, or a star type is to be employed, appropriately in consideration of the reduction ratio that is required of the gear reducer 14, and the like.

Although an embodiment of the present invention has been described above, present aspects are not limited to the above, and can, of course, be implemented by being modified in various ways other than the above within a scope that does not depart from the gist thereof

The invention claimed is:

1. A gear reducer comprising:
   a first gear that rotates about a rotation axis due to rotational force being transmitted to the first gear;
   an eccentric shaft that is joined to the first gear, and that has a supporting portion that is offset in a rotation radial direction with respect to the rotation axis of the first gear;
   an own-axis-rotation restricting member that is disposed at a radial direction outer side of the eccentric shaft;
   a transmitting gear that is supported at the supporting portion of the eccentric shaft, rotation of the transmitting gear around its own axis being restricted due to the transmitting gear being engaged with the own-axis-rotation restricting member, and the transmitting gear revolving around the rotation axis of the first gear due to the first gear rotating together with the eccentric shaft; and
   an output portion that rotates due to the transmitting gear revolving,
   wherein:
   the transmitting gear has a pair of restricting projections that project in a direction of the rotation axis toward the own-axis-rotation restricting member,
   the pair of restricting projections project from a portion of the transmitting gear that is further toward an inner side in a radial direction of the transmitting gear than outer teeth formed at an outer periphery of the transmitting gear, and
   an entirety of the own-axis-rotation restricting member is disposed in a range between the pair of restricting projections.

2. The gear reducer of claim 1, wherein
   the own-axis-rotation restricting member has a pair of engaged surfaces that are respectively disposed so as to face the pair of restricting projections in the rotation radial direction of the eccentric shaft, and
   as seen in the direction of the rotation axis, an outer periphery of the own-axis-rotation restricting member has a shape of a rectangle with a pair of opposite long sides and a pair of opposite short sides, the pair of engaged surfaces being the pair of opposite long sides of the rectangle.

3. A gear reducer comprising:
   a first gear that rotates about a rotation axis due to rotational force being transmitted to the first gear;
   an eccentric shaft that is joined to the first gear, and that has a supporting portion that is offset in a rotation radial direction with respect to the rotation axis of the first gear;
   an own-axis-rotation restricting member that is disposed at a radial direction outer side of the eccentric shaft;
   a transmitting gear that is supported at the supporting portion of the eccentric shaft, rotation of the transmitting gear around its own axis being restricted due to the transmitting gear being engaged with the own-axis-rotation restricting member, and the transmitting gear revolving around the rotation axis of the first gear due to the first gear rotating together with the eccentric shaft;
   an output portion that rotates due to the transmitting gear revolving;
   a lock gear that restricts an amount of rotation of the output portion; and
   a single fixed gear with which the lock gear meshes and with which the own-axis-rotation restricting member engages,
   wherein:
   the transmitting gear has a pair of restricting projections that project in a direction of the rotation axis toward the own-axis-rotation restricting member, and
   the own-axis-rotation restricting member is disposed between the pair of restricting projections.

4. A gearmotor comprising:
   a motor that has a rotation shaft;
   a first gear that rotates about a rotation axis due to rotational force of the rotation shaft being transmitted to the first gear;
   an eccentric shaft that is joined to the first gear, and that has a supporting portion that is offset in a rotation radial direction with respect to the rotation axis of the first gear;
   an own-axis-rotation restricting member that is disposed at a radial direction outer side of the eccentric shaft;
   a transmitting gear that is supported at the supporting portion of the eccentric shaft, rotation of the transmitting gear around its own axis being restricted due to the transmitting gear being engaged with the own-axis-rotation restricting member, and the transmitting gear revolving around the rotation axis of the first gear due to the first gear rotating together with the eccentric shaft; and
   an output portion that rotates due to the transmitting gear revolving,
   wherein:
   the transmitting gear has a pair of restricting projections that project in a direction of the rotation axis toward the own-axis-rotation restricting member,
   the pair of restricting projections project from a portion of the transmitting gear that is further toward an inner side in a radial direction of the transmitting gear than outer teeth formed at an outer periphery of the transmitting gear, and
   an entirety of the own-axis-rotation restricting member is disposed in a range between the pair of restricting projections.

5. The gearmotor of claim 4, wherein
   the own-axis-rotation restricting member has a pair of engaged surfaces that are respectively disposed so as to face the pair of restricting projections in the rotation radial direction of the eccentric shaft, and
   as seen in the direction of the rotation axis, an outer periphery of the own-axis-rotation restricting member has a shape of a rectangle with a pair of opposite long sides and a pair of opposite short sides, the pair of engaged surfaces being the pair of opposite long sides of the rectangle.

6. A gearmotor comprising:
a motor that has a rotation shaft;
a first gear that rotates about a rotation axis due to rotational force of the rotation shaft being transmitted to the first gear;
an eccentric shaft that is joined to the first gear, and that has a supporting portion that is offset in a rotation radial direction with respect to the rotation axis of the first gear;
an own-axis-rotation restricting member that is disposed at a radial direction outer side of the eccentric shaft;
a transmitting gear that is supported at the supporting portion of the eccentric shaft, rotation of the transmitting gear around its own axis being restricted due to the transmitting gear being engaged with the own-axis-rotation restricting member, and the transmitting gear revolving around the rotation axis of the first gear due to the first gear rotating together with the eccentric shaft;
an output portion that rotates due to the transmitting gear revolving;
a lock gear that restricts an amount of rotation of the output portion; and
a single fixed gear with which the lock gear meshes and with which the own-axis-rotation restricting member engages,
wherein:
the transmitting gear has a pair of restricting projections that project in a direction of the rotation axis toward the own-axis-rotation restricting member, and
the own-axis-rotation restricting member is disposed between the pair of restricting projections.

* * * * *